United States Patent
Ionkin et al.

(10) Patent No.: US 10,889,680 B1
(45) Date of Patent: *Jan. 12, 2021

(54) CESIUM AND RUBIDIUM DERIVATIVES AS CATALYSTS FOR POLYURETHANE FOAMS

(71) Applicant: FXI, Inc., Media, PA (US)

(72) Inventors: Alex Sergey Ionkin, Kennett Square, PA (US); Arianna Lubomyra Watters, Philadelphia, PA (US)

(73) Assignee: FXI, Inc., Radnor, PA (US)

( * ) Notice: Subject to any disclaimer, the term of this patent is extended or adjusted under 35 U.S.C. 154(b) by 120 days.

This patent is subject to a terminal disclaimer.

(21) Appl. No.: 16/257,816

(22) Filed: Jan. 25, 2019

Related U.S. Application Data (63) Continuation of application No. 15/704,773, filed on Sep. 14, 2017, now Pat. No. 10,233,278.

(51) Int. Cl.
| | | |
|---|---|---|
| *C08G 18/22* | (2006.01) | |
| *C08G 18/76* | (2006.01) | |
| *C08G 18/48* | (2006.01) | |
| *C08G 101/00* | (2006.01) | |

(52) U.S. Cl.
CPC ........... *C08G 18/222* (2013.01); *C08G 18/48* (2013.01); *C08G 18/7621* (2013.01); *C08G 2101/0008* (2013.01)

(58) Field of Classification Search
CPC ................. C08G 18/222; C08G 18/48; C08G 2101/0008
See application file for complete search history.

(56) References Cited

U.S. PATENT DOCUMENTS

| | | | |
|---|---|---|---|
| 3,033,825 A | | 11/1970 | Murphy |
| 3,539,483 A | | 11/1970 | Keberle |
| 3,625,872 A | * | 12/1971 | Ashida ............... C08L 79/04 521/175 |
| 4,778,844 A | | 10/1988 | Blount |
| 4,900,776 A | | 2/1990 | Bock |
| 5,264,572 A | | 11/1993 | Endo |
| 5,326,833 A | | 7/1994 | Parodi |
| 5,674,920 A | | 10/1997 | Obata |
| 6,100,311 A | | 8/2000 | Eling |
| 7,205,356 B2 | | 4/2007 | Guertler |
| 7,223,478 B2 | | 5/2007 | Treiber |
| 2007/0203289 A1 | | 8/2007 | Bruchmann |
| 2008/0265201 A1 | | 10/2008 | Spyrou |
| 2015/0247057 A1 | | 9/2015 | Latham |
| 2016/0002496 A1 | | 1/2016 | Aou |
| 2016/0102169 A1 | | 4/2016 | Burdeniuc |

FOREIGN PATENT DOCUMENTS

| | | |
|---|---|---|
| DE | 102006004077 | 8/2007 |
| WO | 2015023961 A1 | 2/2015 |

* cited by examiner

*Primary Examiner* — Irina S Zemel
(74) *Attorney, Agent, or Firm* — Rogowski Law LLC (57) ABSTRACT

A method of making flexible polyurethane foams mixes a polyol (a hydroxyl group containing compound) with a cesium and/or rubidium fluoride catalyst, and reacts such mixture with at least one isocyanate. The cesium and/or rubidium fluoride may be used as the sole catalyst, replacing the blowing and gelling catalysts, such as amines, and metallic catalysts, such as a tin catalyst. Or, the cesium and/or rubidium fluoride may be used as a catalyst promoter in combination with traditional amine blowing and gelling catalysts and tin catalysts. The resulting flexible polyurethane foams exhibit increased thermal conductivity and lower levels of volatile organic compound emissions.

20 Claims, 4 Drawing Sheets

CESIUM AND RUBIDIUM DERIVATIVES AS CATALYSTS FOR POLYURETHANE FOAMS

CROSS-REFERENCE TO RELATED APPLICATION

This application is a continuation of U.S. patent application Ser. No. 15/704,773, filed Sep. 14, 2017, pending, the contents of which are incorporated by reference herein.

BACKGROUND OF THE INVENTION

The present invention is generally directed to methods of making flexible polyurethane foams from a mixture of one or more polyols and a catalyst that comprises cesium fluoride or rubidium fluoride, where the mixture is reacted with at least one isocyanate. Optionally, amine or ammonium containing catalysts and metal catalysts may also be present in the foam forming mixture. Preferably, the foaming reaction is performed in the absence of metallic catalysts, and in the absence of amines or ammonium-containing compounds (gelling and blowing catalysts).

Flexible cellular polyurethane structures typically are prepared by generating a gas during polymerization of a liquid reaction mixture comprised of a polyester or polyether polyol, an isocyanate, a surfactant, catalyst and one or more blowing agents. The gas causes foaming of the reaction mixture to form the cellular structure. The surfactant stabilizes the structure.

Polyurethane foams with varying density and hardness may be formed. Tensile strength, tear strength, compression set, air permeability, flame retardancy, thermal conductivity, fatigue resistance, support factor, and cell size distribution may also be varied, as can many other properties. Specific foam characteristics depend upon the selection of the starting materials, the foaming process and conditions, and sometimes on the subsequent processing.

Catalysts are used to control the relative rates of water-isocyanate (gas-forming) and polyol-isocyanate (gelling) reactions. The catalyst may be a single component, or in most cases a mixture of two or more compounds. Heretofore, preferred catalysts for polyurethane foam production were organotin salts and tertiary amines. The amine catalysts are known to have a greater effect on the water-isocyanate reaction, whereas the organotin catalysts are known to have a greater effect on the polyol-isocyanate reaction. Total catalyst levels generally vary from 0 to 5.0 parts by weight per 100 parts polyol. The amount of catalyst used depends upon the formulation employed and the type of catalyst selected. Control of the gelling catalyst level is critical to producing foams with desired air permeability, which is a factor known to significantly affect foam cushioning performance. However, metallic catalysts, such as organotin catalysts, are toxic to health. Thus, one objective is to produce flexible polyurethane foams with desired air permeability and other foam properties without using metallic catalysts, or at least limiting the amount of metallic catalysts in the foaming mixture. And, gelling and blowing catalysts have been known to produce polyurethane foams with significant levels of volatile organic compound (VOC) emissions. Another objective is to produce flexible polyurethane foams with acceptable rise times, yet having reduced VOC emissions.

Therefore, improvements to flexible polyurethane foam production continue to be sought.

BRIEF SUMMARY OF THE INVENTION

Briefly stated, a method of making a flexible polyurethane foam includes the steps of preparing a mixture having at least one hydroxyl group-containing compound and a catalyst selected from the group consisting of cesium fluoride, rubidium fluoride and mixtures thereof. Optionally, one or more amine- or ammonium-containing compounds may be included as supplemental catalysts. Optionally, one or more tin-containing compounds may be included as supplemental catalysts. Preferably, however, the foam-forming mixture is prepared without amine- or ammonium-containing compounds and without metallic catalysts, such as tin-containing compounds. The mixture is reacted with at least one isocyanate to produce a polyurethane foam that has thermal conductive properties and lowered volatile organic compound (VOC) emissions as compared to polyurethane foams made with traditional amine- or ammonium-gelling catalysts and metallic catalysts.

The at least one hydroxyl group-containing compound (e.g., polyol) may be a monool, a diol, a triol, a tetraol, a pentaol, a hexaol, a heptaol, and combinations thereof. Preferably, the polyol is a polyether polyol.

Preferably, the catalyst is introduced to the mixture in a solution with water. If the catalyst is cesium fluoride, preferably the cesium fluoride is present in an amount from 0.005 to 1.0 pph by weight based on 100 parts polyol. If the catalyst is rubidium fluoride, preferably the rubidium fluoride is present in an amount from 0.005 pph to 1.0 pph by weight based on 100 parts polyol.

If included, the amine-containing compound is present in an amount from 0.05 to 0.25 pph by weight based on 100 parts polyol.

If included, the tin-containing compound is present in an amount from 0.03 to 0.1 pph by weight based on 100 parts polyol.

The foam-forming mixture may include one or more additives, such as a surfactant, a cross-linker, a blowing agent, and a performance additive, and mixtures thereof.

The polyurethane foam resulting from the inventive method exhibits thermal conductivity of about 0.05 to 0.2 W/mK, and exhibits lower volatile organic compound (VOC) emissions than a control polyurethane foam prepared without the cesium fluoride or rubidium fluoride catalyst. Polyurethane foam prepared with traditional amines and tin catalyst results in total VOC by percent area of >90% total VOC, with >80% hazardous or amine by-products. Polyurethane foams prepared with cesium fluoride or rubidium fluoride catalysts only (without amine or ammonium containing catalysts and without tin catalysts) result in reduced total VOC by percent area of 75-85% of total VOC, and contains <30% harmful compounds, none of which are hazardous amine derivatives.

BRIEF DESCRIPTION OF THE DRAWINGS

The foregoing summary, as well as the following detailed description of the disclosure, will be better understood when read in conjunction with the appended drawings. For the purpose of illustrating the disclosure, there is shown in the drawings an embodiment of a headrest which is presently preferred. It should be understood, however, that the disclosure is not limited to the precise arrangements and instrumentalities shown. In the drawings.

DESCRIPTION OF THE DISCLOSURE

When used herein, the terms "about," "approximately," "generally," "substantially" and like terms when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Polyether polyols used to prepare flexible polyurethane foams typically have molecular weights between 500 and 7,000. One example of these conventional polyols is Voranol 3010 from Dow Chemical, which has a hydroxyl ("OH") number of 56 mg KOH/g and a functionality of 2.9, with an EO content of 8.5 percent. Another example of a polyether polyol is Voranol 3040 from Dow Chemical, which has an OH number of 56 mg KOH/g and a functionality of 2.9. Dow Chemical also offers Voranol 8136, which has an OH number of 56 mg KOH/g, and Voralux DWJ 4001, with an OH number of 31.2 mg KOH/g. Still another example of a polyether polyol is Rokopol Vtec 8911 from PCC Rokita SA, which has an OH number of 145 mg KOH/g and a functionality between 2 and 10, with an EO content between 10 and 70 percent. Another example is Rokopol vTec 8020 polyether polyol, which has an OH number of 185 mg KOH/g. Yet still another example of a polyether polyol is Rokita M1170 from PCC Rokita SA, which has an OH number of 34 mg KOH/g and a functionality of around 3, with an EO content above 70 percent. There is also a polyol from Covestro AG called Multranol 9199 having an OH number of 37.5 mg KOH/g.

The term "polyether polyol" includes linear and branched polyethers (having ether linkages) and containing at least two hydroxyl groups, and includes polyoxypropylene polyether polyol or mixed poly (oxyethylene/oxypropylene) polyether polyol. Preferred polyethers are the polyoxyalkylene polyols, particularly the linear and branched poly (oxyethylene) glycols, poly (oxypropylene) glycols and their copolymers. Graft or modified polyether polyols are those polyether polyols having a polymer of ethylenically unsaturated monomers dispersed therein. Representative modified polyether polyols include polyoxypropylene polyether polyol into which is dispersed poly (styrene acrylonitrile) or polyurea, and poly (oxyethylene/oxypropylene) polyether polyols into which is dispersed poly (styrene acrylonitrile) or polyurea. Graft or modified polyether polyols contain dispersed polymeric solids. The solids increase hardness and mechanical strength of the resultant foam.

The "hydroxyl number" for a polyol is a measure of the amount of reactive hydroxyl groups available for reaction. The value is reported as the number of milligrams of potassium hydroxide equivalent to the hydroxyl groups found in one gram of the sample. "Functionality" of a polyol is defined as the average number of hydroxyl groups per molecule.

The term "polyisocyanate" includes isocyanates that have previously been suggested for use in preparing polyurethane foams. "Polyisocyanates" include di- and polyisocyanates and prepolymers of polyols and polyisocyanates having excess isocyanate groups available to react with additional polyol. The amount of isocyanate employed is frequently expressed by the term "index" which refers to the actual amount of isocyanate required for reaction with all of the active hydrogen-containing compounds present in the reaction mixture multiplied by 100. For most foam applications, the isocyanate index is in the range from 75 to 140. In this invention, the preferred isocyanate index is in the range of 80 to 95, more preferably about 90.

Conventional polyisocyanates may be used in this invention. The polyisocyanates are toluene diisocyanate (TDI), methylene diisocyanate (MDI), and a mixture of both. A well-known toluene diisocyanate is TD80, a commercially available blend of 80 percent of 2, 4 toluene diisocyanate and 20 percent of 2, 6 toluene diisocyanate. One well known methylene diisocyanate is Mondur 3694 from Covestro AG, which is a low functionality polymeric diphenylmethane diisocyanate with a NCO content of 32-33.5 percent. Another well known methylene diisocyanate is Supersec-7050 from Huntsman/ICI, which is a prepolymer with a NCO content of 32.8 percent with over 50 percent 4, 4'-methylene diisocyanate. Polyisocyanates are typically used at a level of between 20 and 90 parts by weight per 100 parts of polyol, more preferably between 50 and 70 parts by weight per 100 parts of polyol, depending upon the polyol OH content and the water content of the formulation.

Figure 1:
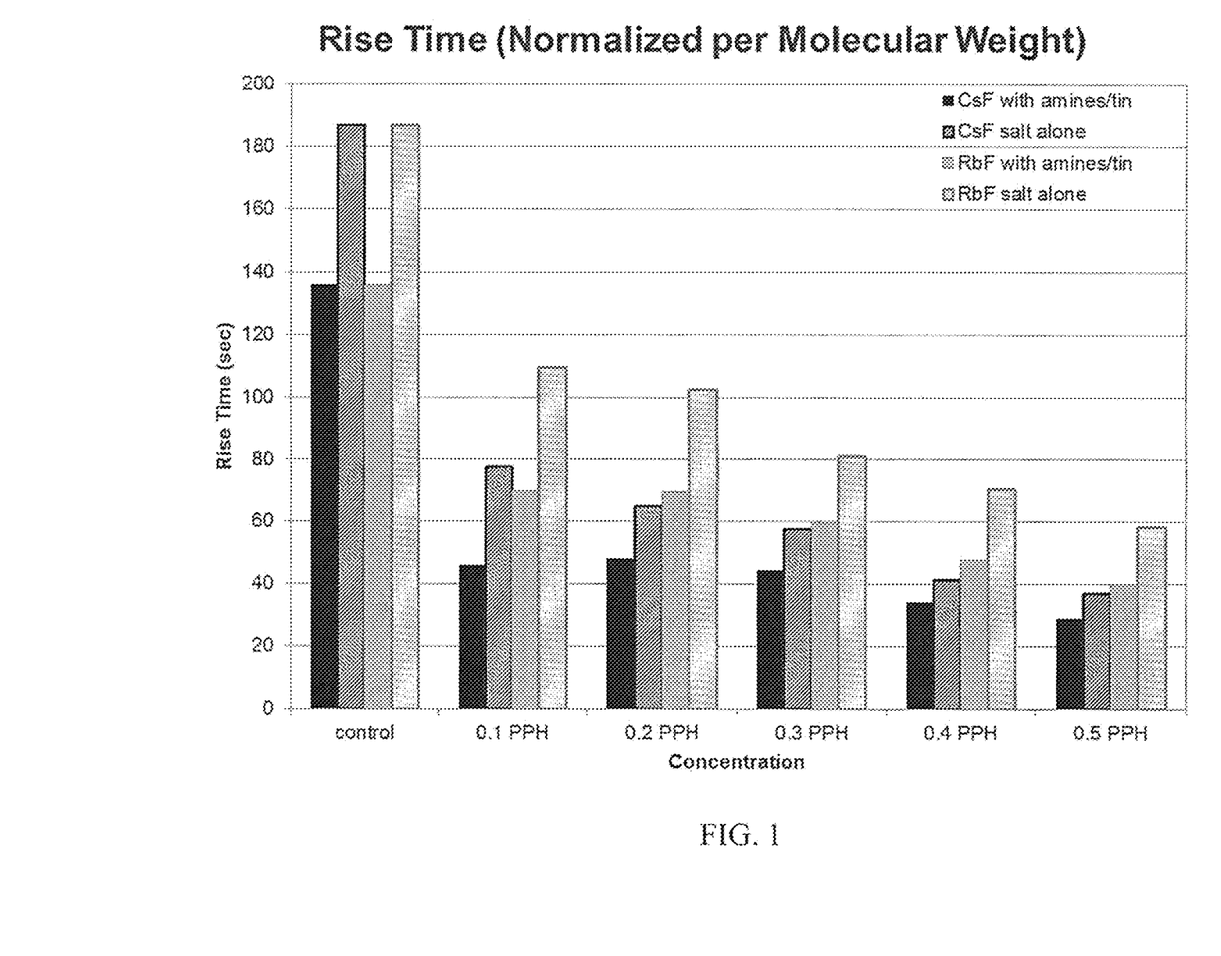
FIG. 1 is a graph showing foam rise time in seconds for polyurethane foam compositions containing varying concentrations of cesium fluoride and rubidium fluoride as catalysts compared to control polyurethane foam compositions.

Instead of metallic catalysts, such as tin catalysts, the polyurethane foam making mixtures according to the invention include from 0.1 to 0.5 parts by weight per 100 parts polyol of either cesium fluoride or rubidium fluoride, or a mixture of the two, as catalyst. As shown in FIG. 1, these catalysts exhibit catalytic activity in polyurethane foams. They show acceptable foam rise times as compared to control foams with amine and tin catalysts. FIG. 1 expresses rise times shown in Tables 1 and 2 for cesium fluoride and rubidium fluoride in identical high airflow conventional foam formulations. The measured rise times have been normalized in order to have the effect of molecular weight of the compounds considered in this kinetic information. The solid colored lines in the graph depict the results for control foams, which were prepared using amines and tin, and the shaded control foams were prepared in the absence of catalyst.

The cesium fluoride and/or rubidium fluoride catalysts first are pre-mixed with the polyol(s), and then the polyol(s) are reacted with one or more isocyanates in the presence of a blowing agent, such as water.

In one preferred embodiment, the cesium fluoride or rubidium fluoride is added to the foam-forming mixture in solution form, such as mixed with deionized water. The catalysts may be mixed with water in a ratio of 50% water by weight. The solution can contain any amount of cesium fluoride or rubidium fluoride until it reaches point of saturation, and a more dilute solution will be less reactive. The water used as the diluent is taken into consideration in reaction kinetics. The added water was adjusted in the Examples reported in the Tables in this application in order to have the total water amount consistent across all foam samples.

Preferably, one or more surfactants are also employed in the foam-forming composition. The surfactants lower the bulk surface tension, promote nucleation of bubbles, stabilize the rising cellular structure and emulsify incompatible ingredients. The surfactants typically used in polyurethane foam applications are polysiloxane-polyoxyalkylene copolymers, which are generally used at levels between about 0.5 and 3 parts by weight per 100 parts polyol. In the present invention from 0 to 3 parts by weight per 100 parts polyol of surfactant is preferred, and 1 to 2.5 parts by weight per 100 parts polyol is most preferred. One suitable surfactant is Tegostab B2370 available from Evonik Industries. Other suitable surfactants are Schill & Seilacher Struksilon 8141 silicone stabilizer and Momentive Performance Materials Niax L627 silicone stabilizer.

A blowing agent may be included in the foam-forming composition. The most typical blowing agent is water that may be added in amounts from 2 to 6 parts by weight per hundred parts polyol, preferably from 2 to 4 parts by weight per hundred parts polyol. It has been found advantageous to add the cesium fluoride and rubidium fluoride catalysts to a foam-forming mixture in a solution with water. Accordingly, this additional water introduced with the catalyst should be taken into account in respect of the total amount of water for the blowing reaction.

In the data reported in Tables 1-4 below, total $H_2O$ is the sum of all water in the system, which reacts with the isocyanate. As the aqueous cesium fluoride content or rubidium fluoride content rises, so does the water. Consequently, the amount of water subsequently added as blowing agent was adjusted so that the total water in the system remained identical for all foam samples in the study.

Cross-linking agents may be included in the foam-forming composition to enhance processing and foam stability. Typically, cross-linking agents are relatively small molecules containing 2 or 3 active hydrogen groups, and are added in amounts from 0 to 4 parts per hundred parts polyol. Representative cross-linking agents that may be included in the reaction mixture of the invention are: diethanolamine (DEOA), ethylene glycol (EG), diethylene glycol (DEG), propylene glycol (PG), dipropylene glycol (DPG), 1, 4-butanediol (BDO). One suitable cross-linking agent is Ortegol 204 having an OH number of 880, available from Evonik Industries. Most preferably, the cross-linking agents are included in amounts from 1 to 3 parts by weight per hundred parts polyol.

Optionally, other additives may be incorporated into the foam-forming composition. The optional additives include, but are not limited, to, fire retardants, stabilizers, antimicrobial compounds, extender oils, dyes, pigments, antistatic agents or other performance additives. Such additives should not have a detrimental effect on the properties of the final polyurethane foam.

The foam-forming method may be carried out batch-wise, continuously or semi-continuously. First, the polyols, any additives and the selected cesium fluoride or rubidium fluoride catalysts are mixed together for at least about one minute. Next, the isocyanate or isocyanate mixture is added to the polyol mixture, and stirred for about 10 to 20 seconds until the mixture starts to cream. When making a single batch, the foaming mixture is poured into a box lined with a paper bag or other liner. The gel time and rise time may be measured while the foam is in the lined box. The box with rising foam is held within a ventilation hood. After the foam rises, and the off gases are expelled, the foam is moved to a cure oven. Usually, the foam is cured in an oven for about 30 minutes at a temperature of 100° C. The cured foams are then transferred under a ventilation hood and generally remain in the ventilation hood for at least about 10 to 12 hours to allow the cured foam to more completely off gas.

The resulting flexible polyurethane foams made using cesium fluoride or rubidium fluoride as the sole or primary catalyst have desired thermal conductivity and lower specific heat. The foams emit fewer VOCs. Accordingly, these catalysts are much less toxic than metallic catalysts, and thus are potentially safer to the environment.

The invention is further illustrated, but not limited by, the following Examples.

Examples

Table 1 shows Cesium Fluoride (CsF) as the sole or primary catalyst, compared with the Control using amine and tin catalysts.

TABLE 1

| Cesium Fluoride in High Airflow Conventional Foam Formulation | | | | | | |
|---|---|---|---|---|---|---|
| Example | CONTROL-1 | CONTROL-2 | 3 | 4 | 5 | 6 |
| Dow 8136 OH#56 | 31 | 31 | 31 | 31 | 31 | 31 |
| DWJ 4001 OH#31.2 | 10 | 10 | 10 | 10 | 10 | 10 |
| Covestro/Bayer 9199 OH#37.5 (70% EO) | 9 | 9 | 9 | 9 | 9 | 9 |
| VTEC 8911 OH#142.5 | 50 | 50 | 50 | 50 | 50 | 50 |
| Struksilon 8141 | 1 | 1 | 1 | 1 | 1 | 1 |
| RZETA | 0.1 | 0 | 0.1 | 0 | 0.1 | 0 |
| ZF456 | 0.15 | 0 | 0.15 | 0 | 0.15 | 0 |
| Tin K29 | 0.06 | 0 | 0.06 | 0 | 0.06 | 0 |
| TD80 | 48.32 | 48.32 | 48.32 | 48.32 | 48.32 | 48.32 |
| CsF (50% in Water) | 0 | 0 | 0.1 | 0.1 | 0.2 | 0.2 |
| H2O Total | 4.2 | 4.2 | 4.2 | 4.2 | 4.2 | 4.2 |
| H2O Added | 4.2 | 4.2 | 4.15 | 4.15 | 4.1 | 4.1 |
| INDEX | 87 | 87 | 87 | 87 | 87 | 87 |
| Batch Size | 2.5x | 2.5x | 2.5x | 2.5x | 2.5x | 2.5x |
| Pressure mBar | atm | Atm | atm | atm | atm | atm |
| Cream (sec) | 10 | 19 | 7 | 12 | 6 | 10 |
| Rise (sec) | 136 | 175 | 120 | 203 | 126 | 170 |
| Health Bubbles | no | no | no | no | no | no |
| Sighback | Minimal | Collapsed | Minimal | Yes | Minimal | Yes |
| Density pcf | 1.69 | N/A | 1.63 | 1.92 | 1.82 | 1.77 |

TABLE 1-continued

Cesium Fluoride in High Airflow Conventional Foam Formulation

| | | | | | | |
|---|---|---|---|---|---|---|
| Airflow [scfm] | 2.12 | N/A | 2.59 | 7.97 | 5.95 | 7.16 |
| Conductivity (W/Mk) | 0.04935 | N/A | 0.04677 | 0.05230 | 0.05045 | 0.04996 |
| Diffusivity (mm2/s) | 0.75103 | N/A | 0.78520 | 0.69430 | 0.75167 | 0.73393 |
| Specific Heat (J/m3K) | 65740 | N/A | 59577 | 75510 | 67130 | 68183 |

| Example | 7 | 8 | 9 | 10 | 11 | 12 |
|---|---|---|---|---|---|---|
| Dow 8136 OH#56 | 31 | 31 | 31 | 31 | 31 | 31 |
| DWJ 4001 OH#31.2 | 10 | 10 | 10 | 10 | 10 | 10 |
| Covestro/Bayer 9199 OH#37.5 (70% EO) | 9 | 9 | 9 | 9 | 9 | 9 |
| VTEC 8911 OH#142.5 | 50 | 50 | 50 | 50 | 50 | 50 |
| Struksilon 8141 | 1 | 1 | 1 | 1 | 1 | 1 |
| RZETA | 0.1 | 0 | 0.1 | 0 | 0.1 | 0 |
| ZF456 | 0.15 | 0 | 0.15 | 0 | 0.15 | 0 |
| Tin K29 | 0.06 | 0 | 0.06 | 0 | 0.06 | 0 |
| TD80 | 48.32 | 48.32 | 48.32 | 48.32 | 48.32 | 48.32 |
| CsF (50% in Water) | 0.3 | 0.3 | 0.4 | 0.4 | 0.5 | 0.5 |
| H2O Total | 4.2 | 4.2 | 4.2 | 4.2 | 4.2 | 4.2 |
| H2O Added | 4.05 | 4.05 | 4 | 4 | 3.95 | 3.95 |
| INDEX | 87 | 87 | 87 | 87 | 87 | 87 |
| Batch Size | 2.5x | 2.5x | 2.5x | 2.5x | 2.5x | 2.5x |
| Pressure mBar | atm | atm | atm | atm | atm | atm |
| Cream (sec) | 6 | 9 | 5 | 7 | 6 | 7 |
| Rise (sec) | 116 | 151 | 89 | 108 | 76 | 97 |
| Health Bubbles | no | no | no | no | no | no |
| Sighback | No | Minimal | Yes | Yes | Yes | Yes |
| Density pcf | 1.70 | 1.69 | 2.02 | 1.63 | 2.02 | 1.73 |
| Airflow [scfm] | 8.52 | 9.01 | 7.11 | 9.50 | 7.45 | 8.51 |
| Conductivity (W/Mk) | 0.05214 | 0.05292 | 0.04884 | 0.05638 | 0.04473 | 0.04818 |
| Diffusivity (mm2/s) | 0.78173 | 0.87120 | 0.71650 | 0.70820 | 0.49633 | 0.65450 |
| Specific Heat (J/m3K) | 66730 | 60747 | 68170 | 80397 | 90163 | 73780 |

Table 2 shows Rubidium Fluoride (RbF) as the sole or primary catalyst, compared with the Control using amine and tin catalysts. The data shown in Tables 1 and 2 are exhibited in the graphs in FIGS. 1, 2 and 3.

TABLE 2

Rubidium Fluoride in High Airflow Conventional Foam Formulation

| Example | CONTROL-13 | CONTROL-14 | 15 | 16 | 17 | 18 |
|---|---|---|---|---|---|---|
| Dow 8136 OH#56 | 31 | 31 | 31 | 31 | 31 | 31 |
| DWJ 4001 OH#31.2 | 10 | 10 | 10 | 10 | 10 | 10 |
| Covestro/Bayer 9199 OH#37.5 (70% EO) | 9 | 9 | 9 | 9 | 9 | 9 |
| VTEC 8911 OH#142.5 | 50 | 50 | 50 | 50 | 50 | 50 |
| Struksilon 8141 | 1 | 1 | 1 | 1 | 1 | 1 |
| RZETA | 0.1 | 0 | 0.1 | 0 | 0.1 | 0 |
| ZF456 | 0.15 | 0 | 0.15 | 0 | 0.15 | 0 |
| Tin K29 | 0.06 | 0 | 0.06 | 0 | 0.06 | 0 |
| TD80 | 48.32 | 48.32 | 48.32 | 48.32 | 48.32 | 48.32 |
| RbF (50% in Water) | 0 | 0 | 0.1 | 0.1 | 0.2 | 0.2 |
| H2O Total | 4.2 | 4.2 | 4.2 | 4.2 | 4.2 | 4.2 |
| H2O Added | 4.15 | 4.15 | 4.1 | 4.1 | 4.05 | 4.05 |
| INDEX | 87 | 87 | 87 | 87 | 87 | 87 |
| Batch Size | 2.5x | 2.5x | 2.5x | 2.5x | 2.5x | 2.5x |
| Pressure mBar | atm | atm | atm | atm | atm | atm |
| Cream (sec) | 10 | 19 | 10 | 17 | 8 | 14 |
| Rise (sec) | 136 | 175 | 126 | 197 | 125 | 184 |
| Health Bubbles | No | No | No | A few | No | No |
| Sighback | Minimal | Collapsed | No | Yes | No | A little |
| Density pcf | 1.69 | N/A | 1.72 | 7.85 | 1.74 | 1.80 |
| Airflow [scfm] | 2.12 | N/A | 3.26 | 7.87 | 9.14 | 8.15 |
| Conductivity (W/Mk) | 0.04935 | N/A | 0.05262 | 0.05297 | 0.05025 | 0.05253 |
| Diffusivity (mm2/s) | 0.75103 | N/A | 0.68320 | 0.88443 | 0.75943 | 0.393797 |
| Specific Heat (J/m3K) | 65740 | N/A | 77203 | 59906 | 66276 | 56010 |

| Example | 19 | 20 | 21 | 22 | 23 | 24 |
|---|---|---|---|---|---|---|
| Dow 8136 OH#56 | 31 | 31 | 31 | 31 | 31 | 31 |
| DWJ 4001 OH#31.2 | 10 | 10 | 10 | 10 | 10 | 10 |
| Covestro/Bayer 9199 OH#37.5 (70% EO) | 9 | 9 | 9 | 9 | 9 | 9 |

TABLE 2-continued

| Rubidium Fluoride in High Airflow Conventional Foam Formulation | | | | | | |
|---|---|---|---|---|---|---|
| VTEC 8911 OH#142.5 | 50 | 50 | 50 | 50 | 50 | 50 |
| Struksilon 8141 | 1 | 1 | 1 | 1 | 1 | 1 |
| RZETA | 0.1 | 0 | 0.1 | 0 | 0.1 | 0 |
| ZF456 | 0.15 | 0 | 0.15 | 0 | 0.15 | 0 |
| Tin K29 | 0.06 | 0 | 0.06 | 0 | 0.06 | 0 |
| TD80 | 48.32 | 48.32 | 48.32 | 48.32 | 48.32 | 48.32 |
| RbF (50% in Water) | 0.3 | 0.3 | 0.4 | 0.4 | 0.5 | 0.5 |
| H2O Total | 4.2 | 4.2 | 4.2 | 4.2 | 4.2 | 4.2 |
| H2O Added | 4.0 | 4.0 | 3.95 | 3.95 | 3.9 | 3.9 |
| INDEX | 87 | 87 | 87 | 87 | 87 | 87 |
| Example | 19 | 20 | 21 | 22 | 23 | 24 |
| Batch Size | 2.5x | 2.5x | 2.5x | 2.5x | 2.5x | 2.5x |
| Pressure mBar | atm | atm | atm | atm | atm | atm |
| Cream (sec) | 6 | 11 | 6 | 9 | 5 | 8 |
| Rise (sec) | 107 | 146 | 86 | 127 | 72 | 105 |
| Health Bubbles | No | No | No | No | No | No |
| Sighback | Minimal | Minimal | Minimal | No | Yes | No |
| Density pcf | 1.71 | 2.14 | 1.75 | 2.17 | 1.89 | 2.61 |
| Airflow [scfm] | 8.06 | 9.01 | 6.57 | 8.33 | 6.26 | 6.79 |
| Conductivity (W/Mk) | 0.05140 | 0.05423 | 0.05045 | 0.05666 | 0.05106 | 0.05224 |
| Diffusivity (mm2/s) | 0.66363 | 0.78940 | 0.55563 | 0.83373 | 0.57257 | 0.73903 |
| Specific Heat (J/m3K) | 77510 | 68836 | 90840 | 68183 | 89190 | 70743 |

Tables 3 and 4 show Cesium Fluoride (CsF) and Potassium Fluoride (KF) as the sole or primary catalyst, respectively, compared with the Control using amine and tin catalysts. Foams presented in Tables 3 and 4 were formulated based on equivalent molar concentrations of 0.005 and 0.01 moles CsF or KF, compared to foams which contain (i) amine and tin, or (ii) no gelling amine; or (iii) no blowing amine. The data shown in Tables 3 and 4 is graphically displayed in FIG. 4.

TABLE 3

| Cesium Fluoride in High Airflow Conventional Foam Formulation Based on Equivalent Molar Concentrations | | | | | | |
|---|---|---|---|---|---|---|
| Example | CONTROL-25 | CONTROL-26 | CONTROL-27 | CONTROL-28 | 29 | 30 |
| Dow 8136 OH#56 | 31 | 31 | 31 | 31 | 31 | 31 |
| DWJ 4001 OH#31.2 | 10 | 10 | 10 | 10 | 10 | 10 |
| Covestro/Bayer 9199 OH#37.5 (70% EO) | 9 | 9 | 9 | 9 | 9 | 9 |
| VTEC8911 OH#142.5 | 50 | 50 | 50 | 50 | 50 | 50 |
| Struksilon 8141 | 1 | 1 | 1 | 1 | 1 | 1 |
| RZETA | 0.1 | 0 | 0 | 0 | 0.1 | 0 |
| ZF456 | 0.15 | 0.15 | 0 | 0 | 0.15 | 0.15 |
| Tin K29 | 0.06 | 0.06 | 0.06 | 0 | 0.06 | 0.06 |
| TD80 | 48.32 | 48.32 | 48.32 | 48.32 | 48.32 | 48.32 |
| CsF (50% in Water) | 0 | 0 | 0 | 0 | 0.7595 | 0.7595 |
| Molar Cone Salt | 0 | 0 | 0 | 0 | 0.005 | 0.005 |
| H2O Total | 4.2 | 4.2 | 4.2 | 4.2 | 4.2 | 4.2 |
| H2O Added | 4.2 | 4.2 | 4.2 | 4.2 | 3.82025 | 3.82025 |
| INDEX | 87 | 87 | 87 | 87 | 87 | 87 |
| Batch Size | 2.5x | 2.5x | 2.5x | 2.5x | 2.5x | 2.5x |
| Pressure mBar | atm | atm | atm | atm | atm | atm |
| Cream (sec) | 14 | 15 | 18 | 19 | 5 | 6 |
| Rise (sec) | 141 | 143 | 159 | 175 | 77 | 82 |
| Health Bubbles | No | No | No | No | No | No |
| Sighback | Minimal | Minimal | Minimal | Collapsed | No | No |
| VOC by % Area | 88.387 | 92.781 | 92.150 | N/A | 85.343 | 87.992 |
| Example | 31 | 32 | 33 | 34 | 35 | 36 |
| Dow 8136 OH#56 | 31 | 31 | 31 | 31 | 31 | 31 |
| DWJ 4001 OH#31.2 | 10 | 10 | 10 | 10 | 10 | 10 |
| Covestro/Bayer 9199 OH#37.5 (70% EO) | 9 | 9 | 9 | 9 | 9 | 9 |
| VTEC8911 OH#142.5 | 50 | 50 | 50 | 50 | 50 | 50 |
| Struksilon 8141 | 1 | 1 | 1 | 1 | 1 | 1 |
| RZETA | 0 | 0 | 0.1 | 0 | 0 | 0 |
| ZF456 | 0 | 0 | 0.15 | 0.15 | 0 | 0 |
| Tin K29 | 0.06 | 0 | 0.06 | 0.06 | 0.06 | 0 |
| TD80 | 48.32 | 48.32 | 48.32 | 48.32 | 48.32 | 48.32 |
| CsF (50% in Water) | 0.7595 | 0.7595 | 1.519 | 1.519 | 1.519 | 1.519 |
| Molar Cone Salt | 0.005 | 0.005 | 0.01 | 0.01 | 0.01 | 0.01 |
| H2O Total | 4.2 | 4.2 | 4.2 | 4.2 | 4.2 | 4.2 |
| H2O Added | 3.82025 | 3.82025 | 3.4405 | 3.4405 | 3.4405 | 3.4405 |

TABLE 3-continued

Cesium Fluoride in High Airflow Conventional Foam Formulation Based on Equivalent Molar Concentrations

| | | | | | | |
|---|---|---|---|---|---|---|
| INDEX | 87 | 87 | 87 | 87 | 87 | 87 |
| Batch Size | 2.5x | 2.5x | 2.5x | 2.5x | 2.5x | 2.5x |
| Pressure mBar | atm | atm | atm | atm | atm | atm |
| Cream (sec) | 6 | 8 | 5 | 6 | 6 | 7 |
| Rise (sec) | 82 | 95 | 45 | 50 | 51 | 54 |
| Health Bubbles | No | No | No | No | No | No |
| Sighback | Minimal | Minimal | Yes | Yes | Yes | A little |
| VOC by % Area | 81.357 | 81.383 | 83.492 | 85.019 | 83.180 | 83.979 |

TABLE 4

Potassium Fluoride in High Airflow Conventional Foam Formulation Based on Equivalent Molar Concentrations

| Example | CONTROL-25 | CONTROL-26 | CONTROL-27 | CONTROL-28 | CONTROL-37 | CONTROL-38 |
|---|---|---|---|---|---|---|
| Dow 8136 OH#56 | 31 | 31 | 31 | 31 | 31 | 31 |
| DWJ 4001 OH#31.2 | 10 | 10 | 10 | 10 | 10 | 10 |
| Covestro/Bayer 9199 OH#37.5 (70% EO) | 9 | 9 | 9 | 9 | 9 | 9 |
| VTEC 8911 OH#142.5 | 50 | 50 | 50 | 50 | 50 | 50 |
| Struksilon 8141 | 1 | 1 | 1 | 1 | 1 | 1 |
| RZETA | 0.1 | 0 | 0 | 0 | 0.1 | 0 |
| ZF456 | 0.15 | 0.15 | 0 | 0 | 0.15 | 0.15 |
| Tin K29 | 0.06 | 0.06 | 0.06 | 0 | 0.06 | 0.06 |
| TD80 | 48.32 | 48.32 | 48.32 | 48.32 | 48.32 | 48.32 |
| KF (50% in Water) | 0 | 0 | 0 | 0 | 0.29 | 0.29 |
| Molar Cone Salt | 0 | 0 | 0 | 0 | 0.005 | 0.005 |
| H2O Total | 4.2 | 4.2 | 4.2 | 4.2 | 4.2 | 4.2 |
| H2O Added | 4.2 | 4.2 | 4.2 | 4.2 | | |
| INDEX | 0.87 | 0.87 | 0.87 | 0.87 | 0.87 | 0.87 |
| Batch Size | 2.5x | 2.5x | 2.5x | 2.5x | 2.5x | 2.5x |
| Pressure mBar | atm | atm | atm | atm | atm | atm |
| Cream (sec) | 14 | IS | 18 | 19 | 7 | 7 |
| Rise (sec) | 141 | 143 | 159 | 175 | 67 | 81 |
| Health Bubbles | No | No | No | No | No | No |
| Sighback | Minimal | Minimal | Minimal | Collapsed | Yes | Yes |
| VOC by % Area | 88.387 | 92.781 | 92.150 | N/A | 94.950 | 95.01 |

| Example | CONTROL-39 | CONTROL-40 | CONTROL-41 | CONTROL-42 | CONTROL-43 | CONTROL-44 |
|---|---|---|---|---|---|---|
| Dow 8136 OH#56 | 31 | 31 | 31 | 31 | 31 | 31 |
| DWJ 4001 OH#31.2 | 10 | 10 | 10 | 10 | 10 | 10 |
| Covestro/Bayer 9199 OH#37.5 (70% EO) | 9 | 9 | 9 | 9 | 9 | 9 |
| VTEC 8911 OH#142.5 | 50 | 50 | 50 | 50 | 50 | 50 |
| Struksilon 8141 | 1 | 1 | 1 | 1 | 1 | 1 |
| RZETA | 0 | 0 | 0.1 | 0 | 0 | 0 |
| ZF456 | 0 | 0 | 0.15 | 0.15 | 0 | 0 |
| Tin K29 | 0.06 | 0 | 0.06 | 0.06 | 0.06 | 0 |
| TD80 | 48.32 | 48.32 | 48.32 | 48.32 | 48.32 | 48.32 |
| KF (50% in Water) | 0.29 | 0.29 | 0.58 | 0.58 | 0.58 | 0.58 |
| Molar Cone Salt | 0.005 | 0.005 | 0.01 | 0.01 | 0.01 | 0.014.2 |
| H2O Total | 4.2 | 4.2 | 4.2 | 4.2 | 4.2 | 4.2 |
| H2O Added | | | | | | |
| INDEX | 0.87 | 0.87 | 0.87 | 0.87 | 0.87 | 0.87 |
| Batch Size | 2.5x | 2.5x | 2.5x | 2.5x | 2.5x | 2.5x |
| Pressure mBar | atm | atm | atm | atm | atm | atm |
| Cream (sec) | 8 | 10 | 6 | 7 | 7 | 8 |
| Rise (sec) | 101 | 103 | 56 | 50 | 60 | 60 |
| Health Bubbles | No | No | No | No | No | No |
| Sighback | A little | Yes | Yes | Yes | Yes | Yes |
| VOC by % Area | 78.491 | 90.516 | 88.448 | 93.448 | 91.554 | 86.985 |

In the Examples, the amounts are expressed in parts by weight per 100 parts polyol. The polyols may include: Dow Voranol 8136, a triol polyether polyol; PCC Group Rokopol vTec 8911 polyether polyol specifically formulated for MDI-based viscoelastic foam production; PCC Group Rokopol vTec 8020 polyether polyol specifically formulated for viscoelastic foam production; Covestro Multranol 9199 polyether polyol; and Dow Voralux DWJ 4001 polyether polyol.

The isocyanates may include: Covestro Mondur TD80 toluene diisocyanate.

Catalysts may include: Sigma-Aldrich Dabco 33LV triethylenediamine in dipropylene glycol; Tosoh Specialty Chemicals RZETA reactive gelling catalyst; Huntsman Corp. JeffCat ZF 456 amine catalyst; Momentive Performance Materials Niax A-1 bis(2-dimethylaminoethyl) ether catalyst; Evonik Industries Kosmos K29 tin catalyst; and Evonik Industries Dabco T900 stannous octoate metal catalyst.

Polyurethane foam additives of the foams in the Examples include cell openers, stabilizers, cross-linking agents.

Representative cell openers and stabilizers may include: Schill & Seilacher Struksilon 8141 stabilizer; and Momentive Performance Materials Niax L627 silicone stabilizer.

Representative cross-linking agents may include: Evonik Industries Ortegol 204 specifically formulated for slabstock polyurethane foams.

For the Examples reported in Tables 1-4 above, foam was prepared as a hand pour sample, batch size 2.5× based on 100 g polyol. Polyol, surfactant, amines, water and aqueous salt compound were added to the container and homogeneously mixed by overhead high shear mixer. Tin catalyst was added and the mixture was further mixed. Isocyanate was added last, and mixed for a few seconds. The mixture with isocyanate was poured into a second container immediately prior to cream, and the foam is allowed to rise. 30 minutes after pouring the foam forming mixture, the risen foam is cured in an oven for 1 hour at 120° C.

Thermal properties of the foam were evaluated using a Hot Disk Thermal Constants Analyzer 7.2.8 and corresponding software, manufactured by Thermtest, Inc. The hot disk used in this study was the Hot Disk 8563 with a 9.868 mm Kapton sensor. Samples were prepared for evaluation by cutting two 2×2×1 inch blocks and conditioned in a temperature and humidity controlled room for a minimum of 24 hours prior to testing. The test was carried out by placing a precut foam block on either side of the thermal probe, and securing in place without compressing the foam. The test was run as an isotropic system with a measurement time of 80 seconds and heating power of 40 mW with a probe depth of 15 mm. The software output provides direct measurements on thermal conductivity (mW/K), thermal diffusivity ($mm^2/s$) and specific heat ($MJ/m^3 K$).

VOC emission was measured by cutting a sample of foam from the interior of the sample no later than 5 days after reaction. Each sample weighed 0.04±0.001 grams, and was inserted into a sterile glass tube. The sample and glass tube were inserted in a Gerstel Thermal Desorption Unit (TDU), which is connected to a Gas Chromatography/Mass Spectrometer (GC/MS) Instrument. The foam sample was heated to 150° C. for 3 minutes, and the gas collected from the sample was directly injected to the GC/MS for compositional analysis. All measured peaks which made up >2% by total area of all identifiable volatile components were considered for evaluation.

Referring to FIG. 1, it is seen that cesium fluoride as catalyst in amounts from 0.1 to 0.5 parts per hundred parts polyol exhibited fast rise times when used alone or in combination with added amine and tin catalysts. Rubidium fluoride as catalyst in amounts from 0.1 to 0.5 parts per hundred parts polyol also exhibited fast rise times when used alone or in combination with added amines and tin catalysts. Accordingly, these salts show suitable catalytic effect for making polyurethane foams. For foam-forming compositions containing an equivalent molar concentration of salt catalyst, the rate of catalytic activity is fastest for foams containing cesium fluoride, whether used alone or supplemented with additional amine and tin catalysts.

Figure 2:
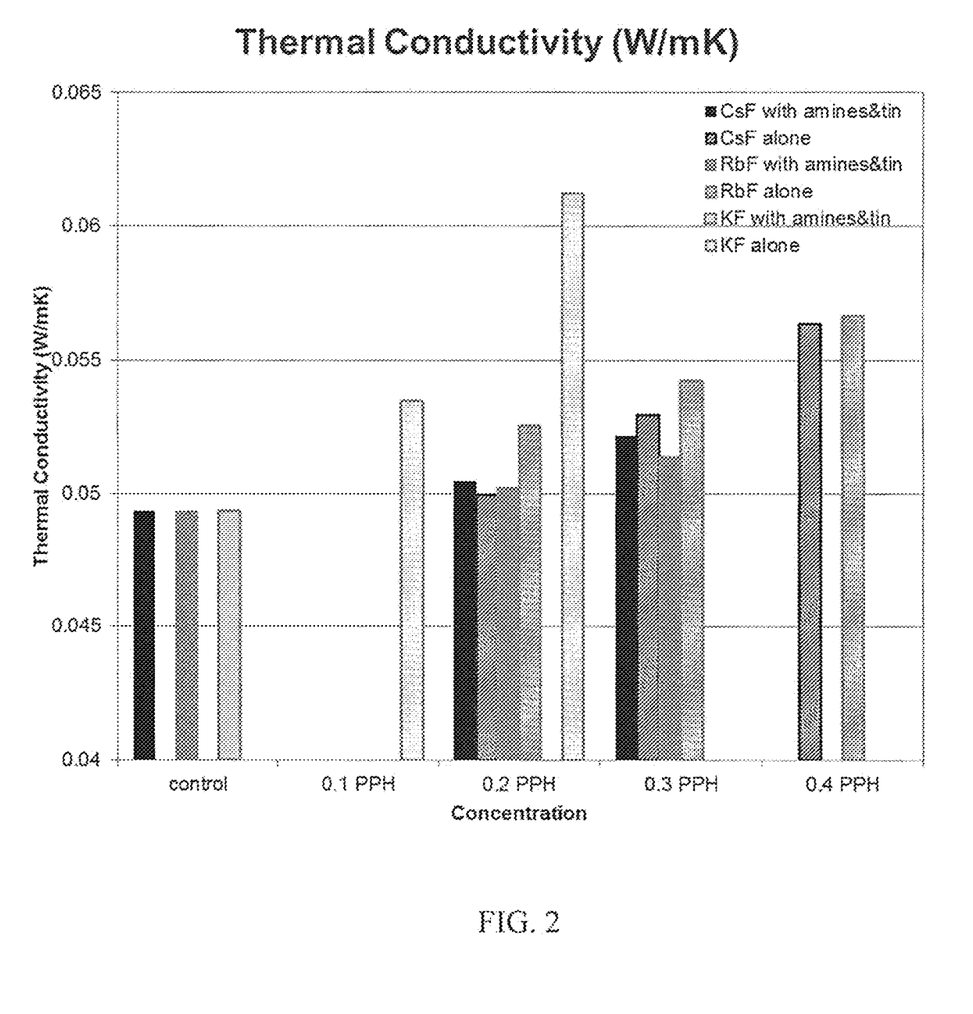
FIG. 2 is a graph showing thermal conductivity in W/mK for polyurethane foams produced with compositions containing cesium fluoride or rubidium fluoride or potassium fluoride as catalysts, showing improvement in thermal conductivity over the control foams.

Referring to FIG. 2, it is seen that polyurethane foams made with cesium fluoride as catalyst or made with rubidium fluoride as catalyst have improved thermal conductivity over control foams. For foam-forming compositions containing an equivalent molar concentration of salt catalyst, the thermal conductivity of the foams produced increased for cesium fluoride and rubidium fluoride as compared to the control, and as compared to potassium fluoride as catalyst.

Figure 3:
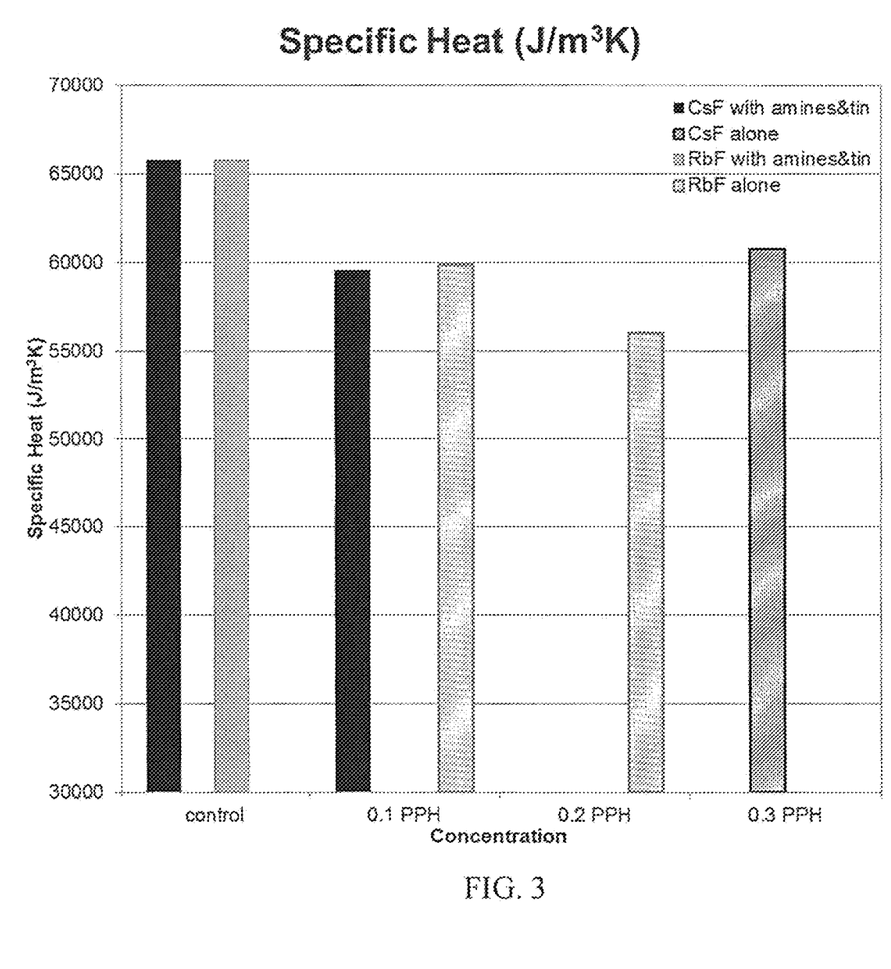
FIG. 3 is a graph showing specific heat in $J/m^3K$ for polyurethane foams produced with compositions containing cesium fluoride or rubidium fluoride as catalysts, showing improvement in specific heat over the control foams.

FIG. 3 shows that cesium fluoride and rubidium fluoride as catalysts produce foams which require lower amounts of power to heat the foam as compared with control foams. In particular, foams that contain cesium fluoride or rubidium fluoride without the presence of amine and tin catalysts require less power to heat than control foams that do not contain these salt compounds, or foams containing a combination of salt compounds and amine and tin catalyst package.

Figure 4:
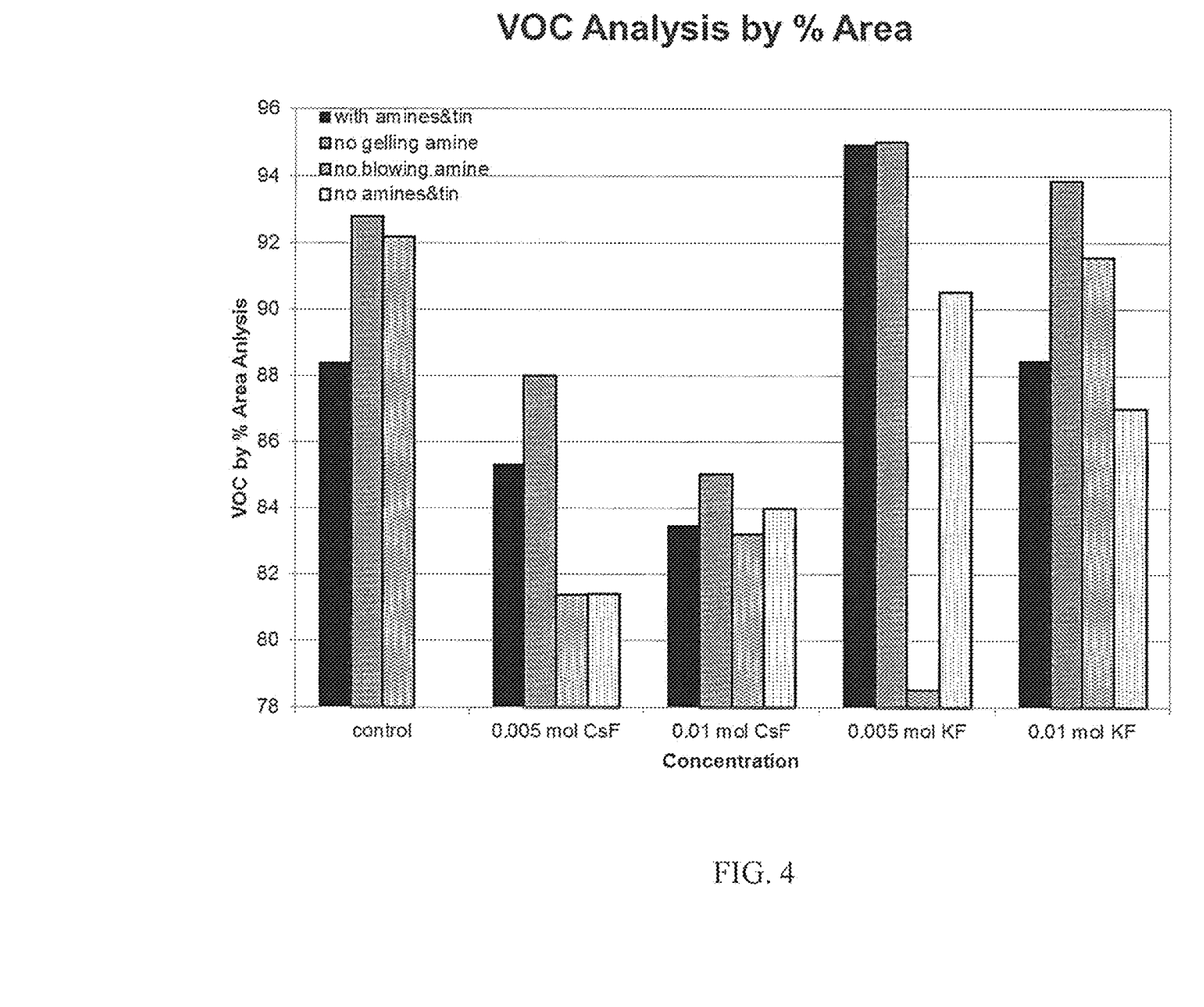
FIG. 4 is a graph showing volatile organic compound (VOC) emissions by percent area of polyurethane foams produced with compositions containing cesium fluoride as compared to compositions containing potassium fluoride as catalysts, showing lower emissions for the polyurethane foams produced with compositions containing cesium fluoride catalyst.

FIG. 4 shows that polyurethane foams produced with cesium fluoride as catalyst, whether used alone or combined with amine and tin catalysts, emit fewer volatile organic compounds than foams produced with other catalytic components. In contrast, the polyurethane foams produced with potassium fluoride generally exhibited much higher VOC emissions, more comparable to the other control foams without the metal catalysts. While not wishing to be bound by any one theory, it is believed that the VOC compounds detected in emissions from the control foams include unreacted polyol, isocyanate impurities, silicones, unreacted amines and amine and tin byproducts.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

We claim:

1. A method of making a flexible polyurethane foam, comprising:
   (a) preparing a mixture comprising at least one hydroxyl group-containing compound and a catalyst selected from the group consisting of cesium fluoride, rubidium fluoride and mixtures thereof, wherein the catalyst is present in an amount from 0.1 to 0.5 pph by weight based on parts of polyol; and
   (b) reacting the mixture with at least one isocyanate.

2. The method according to claim 1, wherein the at least one hydroxyl group-containing compound is selected from the group consisting of a monool, a diol, a triol, a tetraol, a pentaol, a hexaol, a heptaol, and combinations thereof.

3. The method according to claim 1, wherein the catalyst is introduced to the mixture a) as a solution with water.

4. The method according to claim 1, wherein the reacting step is performed in the absence of an amine-containing or an ammonium-containing compound.

5. The method according to claim 1, wherein the reacting step is performed in the absence of a tin-containing compound.

6. The method according to claim 1, wherein the reacting step is performed in the absence of an amine-containing or an ammonium-containing compound, and in the absence of a tin-containing compound.

7. The method according to claim 1, wherein the reacting step a) is carried out in the presence of at least one additional catalyst selected from the group consisting of an amine-containing compound, an ammonium-containing compound, and a tin-containing compound.

8. The method according to claim 7, wherein the amine-containing compound is present in an amount from 0.05 to 0.25 pph by weight based on parts of polyol.

9. The method according to claim 7, wherein the tin-containing compound is present in an amount from 0.03 to 0.1 pph by weight based on parts of polyol.

10. The method according to claim 1, wherein the mixture a) further comprises at least one additive.

11. The method according to claim 10, wherein the additive is selected from the group consisting of a surfactant, a cross-linker, a blowing agent, a performance additive, and mixtures thereof.

12. The method according to claim 11, wherein the mixture consists essentially of the at least one polyol, the catalyst selected from the group consisting of cesium fluoride and rubidium fluoride and mixtures thereof, and the at least one additive.

13. The method according to claim 12, wherein the polyol comprises a polyether polyol.

14. A flexible polyurethane foam prepared by the method of claim 1.

15. The flexible polyurethane foam according to claim 14, wherein the polyurethane foam exhibits thermal conductivity of about 0.05 to 0.2 W/mK.

16. The flexible polyurethane foam according to claim 14, wherein the polyurethane foam exhibits lower volatile organic compound (VOC) emissions than a control polyurethane foam prepared without using the cesium fluoride or rubidium fluoride as catalyst.

17. A flexible polyurethane foam prepared by the method of claim 12.

18. The flexible polyurethane foam of claim 17, wherein the at least one polyol is a polyether polyol.

19. A polyurethane foam-forming composition, comprising:
   at least one hydroxyl group-containing compound;
   a catalyst selected from the group consisting of cesium fluoride, rubidium fluoride and mixtures thereof; and
   at least one isocyanate.

20. The polyurethane foam-forming composition of claim 19, further comprising at least one additional catalyst selected from the group consisting of an amine-containing compound, an ammonium-containing compound, and a tin-containing compound.

* * * * *